No. 692,021. Patented Jan. 28, 1902.
B. G. LAMME.
REGULATION OF ROTARY CONVERTER ELECTROMOTIVE FORCE.
(Application filed Apr. 17, 1901.)
(No Model.) 2 Sheets—Sheet 1.

WITNESSES:
C. L. Belcher
J. C. Morse

INVENTOR
Benjamin G. Lamme
BY
Kerley G. Carr
ATTORNEY.

No. 692,021. Patented Jan. 28, 1902.
B. G. LAMME.
REGULATION OF ROTARY CONVERTER ELECTROMOTIVE FORCE.
(Application filed Apr. 17, 1901.)

(No Model.) 2 Sheets—Sheet 2.

WITNESSES:
C. L. Belcher
Birney Hines

INVENTOR
Benjamin G. Lamme
BY
Whiley G. Carr
ATTORNEY.

UNITED STATES PATENT OFFICE.

BENJAMIN G. LAMME, OF PITTSBURG, PENNSYLVANIA, ASSIGNOR TO THE WESTINGHOUSE ELECTRIC & MANUFACTURING COMPANY, A CORPORATION OF PENNSYLVANIA.

REGULATION OF ROTARY-CONVERTER ELECTROMOTIVE FORCE.

SPECIFICATION forming part of Letters Patent No. 692,021, dated January 28, 1902.

Application filed April 17, 1901. Serial No. 56,331. (No model.)

*To all whom it may concern:*

Be it known that I, BENJAMIN G. LAMME, a citizen of the United States, residing at Pittsburg, in the county of Allegheny and State of Pennsylvania, have invented new and useful Improvements in Regulation of Rotary-Converter Electromotive Force, of which the following is a specification.

My invention relates to apparatus employed for converting alternating-current electrical energy into direct-current energy for the use of translating devices; and it has for its object to provide a combination and arrangement of apparatus which shall be specially adapted for varying the direct-current electromotive force in accordance with the load on the direct-current circuit.

My invention is illustrated in the accompanying drawings, in which—

Figure 1:
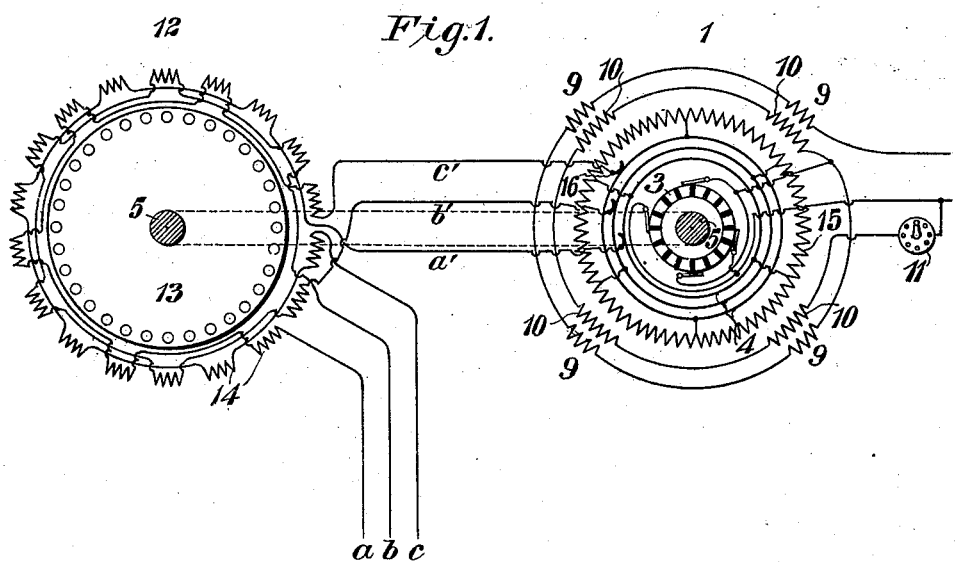
Figure 2:
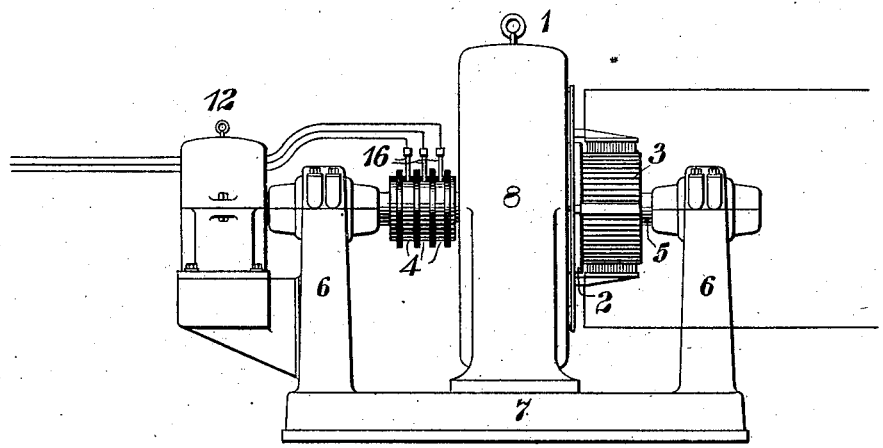
Figure 3:
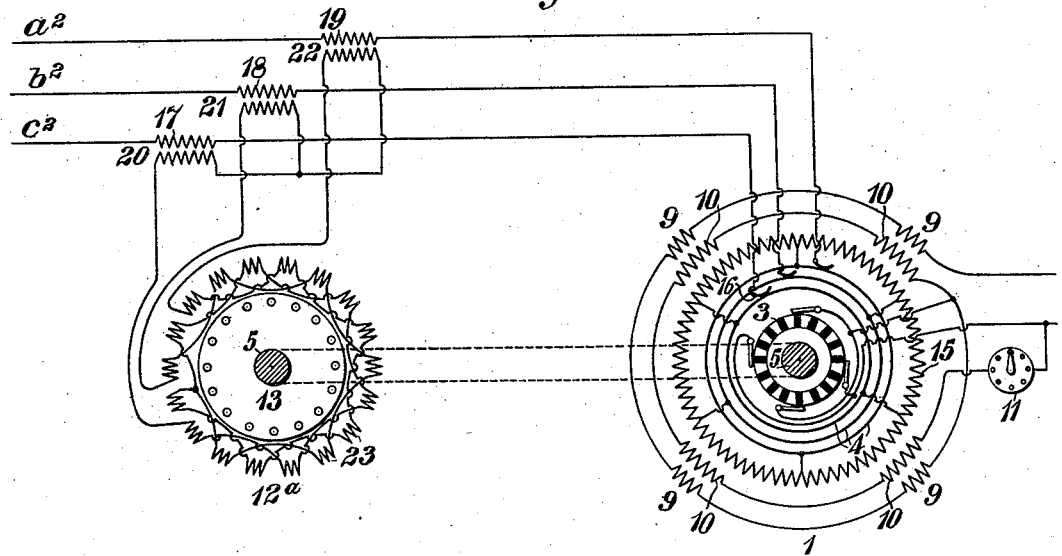

Figure 1 is a diagrammatic representation of apparatus suitable for practicing the invention; and Fig. 2 is a side elevation of the apparatus shown diagrammatically in Fig. 1. Fig. 3 is a diagrammatic representation of a modification of my invention.

The rotary converter 1 has its armature 2, commutator-drum 3, and collector-rings 4 mounted upon a shaft 5 in the usual manner, the shaft being journaled in suitable bearings in pillars or standards 6, a suitable base-plate 7 being provided for these standards and the field-magnet 8.

The field-magnet and field-magnet windings of the rotary converter may be of any suitable character; but for convenience of auxiliary regulation I have shown the field-magnet as provided with series coils 9 and shunt-coils 10, the circuit of the latter having a rheostat 11 included in it in order that the resistance of such circuit may be varied in accordance with the electromotive-force regulation desired.

The rotary converter is combined with an induction-motor 12, the secondary member 13 of which is shown as mounted upon the shaft 5; but it obviously might be otherwise coupled or geared to such shaft in order to rotate therewith.

The primary windings 14 of the motor 12 are so arranged and connected as to provide magnetic poles that exceed in number those of the rotary converter, so that the secondary member 13 shall operate above normal synchronous speed. As here indicated, the motor has six poles and the rotary converter four poles, any other suitable ratio being permissible, however.

The primary windings 14 of the motor have as many independent circuits as there are supply-leads. In the present instance, the currents being of three phases, there are three independent circuits and six leads $a\ b\ c$ and $a'\ b'\ c'$ instead of three, as is usual with three-phase windings.

If two-phase currents were employed, there would be four independent windings on the motor and eight leads.

The leads $a'\ b'\ c'$ from the motor-windings 14 are so connected to the rotary-converter armature-windings 15 by means of brushes 16 and collector-rings 4 as to put the said windings in series with each other.

Since the rotary converter is operated from an approximately constant potential circuit, its speed and that of the motor will be approximately constant for all loads. Changes in load, however, call for corresponding changes in the amount of energy supplied thereto by the rotary converter, and since the secondary member of the motor is mechanically connected to the armature of the converter there is no variation in the slip of the motor, and if it is operated above synchronous speed it reinforces the electromotive-force component of the rotary-converter energy in accordance with the changes in load on the converter, or, stated in another way, when an induction-motor is rotated either above or below synchronous speed any variation in the current input or output must be caused by a variation in slip, or in voltage, or in both. In the present case there is no variation in the slip, and consequently all variations in current are due to corresponding variations in voltage. It follows, therefore, that as the load on the direct-current circuit varies the current to supply the load varies, and the current variations are in turn dependent, in whole or in part, upon voltage variations of the motor.

The compound winding of the field-magnet of the rotary converter may also be so adjusted and utilized as to effect an auxiliary adjustment of the electromotive force as the load comes on, as is set forth in Patent No. 571,863, granted to R. D. Mershon, November 24, 1896, or in Patent No. 620,343, granted to R. D. Mershon, February 28, 1899.

If the currents to the rotary converter are of such quality that an inconvenient winding would be required on the motor, the latter may be supplied from series-transformers, the secondaries of which are interconnected in the usual star or delta manner for polyphase currents. With this arrangement the primary windings of the motor may be disposed and connected as is usual in polyphase induction-motors. I have illustrated this modification in Fig. 3, in which conductors $a^2$ $b^2$ $c^2$, that supply current to the rotary converter, are not connected to the motor, but have the primary windings 17, 18, and 19 of transformers 20, 21, and 22, respectively, included therein. The secondaries of these transformers are connected to the primary windings 23 of the motor $12^a$, which are here shown as arranged in star connection. Except as above specified, the modification shown in Fig. 3 has the same structure and mode of operation as the form of the invention shown in Figs. 1 and 2.

It will be understood that the result attained by mounting the secondary member of the motor upon the armature-shaft of the rotary converter and providing the primary member of the motor with windings that insure a number of poles that exceeds the number of rotary-converter field-magnet poles may be also attained by employing a motor having the same or a less number of poles than the rotary converter and connecting the secondary member to the armature of the rotary converter by suitable speed-changing gearing, so that the motor-secondary will be rotated above synchronous speed. It will be also understood that suitable gearing may be employed between the motor-secondary and the converter-armature for either reducing or increasing the speed of the former, whether the poles of the two machines be equal or unequal in number, provided the relation between the number of motor-poles and the gearing is such as to insure the desired degree of variation of the direct-current electromotive force.

My invention is not intended to be limited to specific types of machines as regards windings, numbers of poles, or relative speeds of operation, except in so far as limitations may be imposed by the prior art and expressed in the claims.

I claim as my invention—

1. The combination with a rotary converter and an induction-motor having a greater number of poles than the converter, of mechanical connections between the rotatable members of said machines and means for supplying alternating currents to the said machines in series.

2. The combination with a rotary converter and an induction-motor, having as many independent primary windings as there are phases of current and arranged to produce a number of magnetic poles that exceeds the number of rotary-converter magnetic poles, of mechanical connections between the rotatable members of said machines and means for connecting the primary windings of the motor in series with the armature-windings of the rotary converter.

3. The combination with a rotary converter and an induction-motor, having a plurality of independent primary windings, the latter being connected and arranged to produce magnetic poles that exceed in number those of the converter, of mechanical connections between the armature of the converter and the secondary member of the motor and means for supplying polyphase alternating currents to the primary windings of the motor and armature-windings of the rotary converter in series.

4. The combination with a rotary converter, having a compound-wound field-magnet of a given number of poles, of an induction-motor, having its secondary member mechanically connected to the armature of the rotary converter, and provided with a plurality of primary windings which are connected and arranged to produce magnetic poles that exceed in number those of the rotary converter, said motor primary windings and rotary-converter armature-windings being connected in series and supplied with polyphase alternating currents.

5. The combination with a rotary converter having a given number of poles, of an induction-motor mechanically connected thereto and having a greater number of poles, and means for connecting the armature-windings of the converter and the primary windings of the motor in series with each other.

6. The combination with a rotary converter and an induction-motor having their rotatable members mechanically connected together and means for supplying polyphase currents to the primary member of the motor and to the armature of the converter in series so as to produce magnetic poles in the motor, the number of which exceeds the number of magnetic poles in the converter.

7. The combination with a rotary converter having a given number of poles and an induction-motor having a greater number of poles and having a primary winding that is provided with twice as many leads as it has polyphase circuits, of mechanical connections between the rotatable members of the two machines and electrical connections between one-half of said leads and the converter-armature.

8. The combination with a rotary converter and an induction-motor, of means for connecting the primary windings of the motor and the armature-windings of the converter in series and mechanical connections between the secondary member of the motor and the armature of the converter, the relation between the windings and mechanical connections being such as to insure rotation of the secondary member of the motor at other than synchronous speed.

9. The combination with a polyphase induction-motor and a rotary converter having their rotatable members mechanically connected together, of means for connecting the primary windings of the motor and the armature-windings of the converter in series, the relation between the windings and mechanical connections being such that the motor operates at other than synchronous speed.

In testimony whereof I have hereunto subscribed my name this 13th day of April, 1901.

BENJ. G. LAMME.

Witnesses:
WESLEY G. CARR,
BIRNEY HINES.